(12) United States Patent
Sharifi Mehr

(10) Patent No.: US 10,523,434 B1
(45) Date of Patent: Dec. 31, 2019

(54) DATA STORAGE KEY ROTATION

(71) Applicant: Amazon Technologies, Inc., Seattle, WA (US)

(72) Inventor: Nima Sharifi Mehr, Vancouver (CA)

(73) Assignee: Amazon Technologies, Inc., Seattle, WA (US)

(*) Notice: Subject to any disclaimer, the term of this patent is extended or adjusted under 35 U.S.C. 154(b) by 421 days.

(21) Appl. No.: 15/061,937

(22) Filed: Mar. 4, 2016

(51) Int. Cl.
H04L 9/08 (2006.01)
G06F 21/60 (2013.01)
G06F 9/445 (2018.01)
G06F 21/62 (2013.01)

(52) U.S. Cl.
CPC ............ *H04L 9/0891* (2013.01); *G06F 9/445* (2013.01); *G06F 21/602* (2013.01); *G06F 21/6218* (2013.01)

(58) Field of Classification Search
CPC ..... H04L 9/0891; G06F 9/445; G06F 21/602; G06F 21/6218
See application file for complete search history.

(56) References Cited

U.S. PATENT DOCUMENTS

| 8,606,720 B1* | 12/2013 | Baker | G06Q 20/00 705/64 |
| 9,003,558 B1* | 4/2015 | Dorwin | H04L 47/801 726/30 |
| 2002/0019935 A1* | 2/2002 | Andrew | G06F 12/1408 713/165 |
| 2003/0041263 A1* | 2/2003 | Devine | G06F 11/0709 726/4 |
| 2004/0083380 A1* | 4/2004 | Janke | G06K 19/073 713/194 |
| 2005/0204154 A1* | 9/2005 | Osaki | H04L 9/088 713/193 |
| 2005/0289060 A1* | 12/2005 | Abumehdi | G06Q 10/08 705/50 |
| 2006/0083228 A1* | 4/2006 | Ong | G06F 21/34 370/389 |

(Continued)

OTHER PUBLICATIONS

Prakash et al., Data Encryption and Decryption Algorithms using Key Rotations for Data Security in Cloud System, Jul. 2014, International Conference on Signal Propagation and Computer Technology, pp. 624-629 (Year: 2014).*

(Continued)

*Primary Examiner* — Kenneth W Chang
(74) *Attorney, Agent, or Firm* — Davis Wright Tremaine LLP

(57) ABSTRACT

The present document describes a data storage system that includes a sandboxed execution environment. The execution environment is made available to clients of the data storage system. Clients are able to upload executable instructions to the execution environment, which can be used to manipulate data stored on the data storage system. In various examples, clients use the execution environment to perform key rotation operations on encrypted data stored on the data storage system. Clients transfer executable instructions and cryptographic keys to the execution environment, where the encrypted data stored on the data storage system can be read into the execution environment, decrypted with an old key, re-encrypted with a new key, and returned to the data storage system.

20 Claims, 10 Drawing Sheets

(56) References Cited

U.S. PATENT DOCUMENTS

| | | | | |
|---|---|---|---|---|
| 2006/0277316 | A1* | 12/2006 | Wang | H04L 29/06027 709/231 |
| 2007/0074047 | A1* | 3/2007 | Metzger | H04L 9/12 713/193 |
| 2007/0079119 | A1* | 4/2007 | Mattsson | G06F 21/602 713/164 |
| 2008/0091955 | A1* | 4/2008 | Leach | H04L 9/06 713/193 |
| 2010/0070754 | A1* | 3/2010 | Leach | G06F 21/6254 713/152 |
| 2011/0099194 | A1* | 4/2011 | Trevor | G06F 17/30896 707/769 |
| 2011/0188651 | A1* | 8/2011 | Iswandhi | G06F 12/00 380/44 |
| 2011/0191595 | A1* | 8/2011 | Damian | G06F 12/14 713/189 |
| 2012/0140923 | A1* | 6/2012 | Lee | H04L 9/088 380/45 |
| 2013/0111546 | A1* | 5/2013 | Gargiulo | H04L 9/32 726/1 |
| 2014/0089674 | A1* | 3/2014 | Buehl | G06F 12/14 713/189 |
| 2014/0230007 | A1* | 8/2014 | Roth | G06F 21/6209 726/1 |

OTHER PUBLICATIONS

Campagna, M., "AWS Key Management Service Cryptographic Details," Amazon Web Services, 28 pages, May 2015.

"JavaScript Engine," Wikipedia, the Free Encyclopedia, <https://en.wikipedia.org/wiki/JavaScript_engine> [retrieved Jan. 26, 2016], 6 pages.

"Sandbox (Computer Security)," Wikipedia, the Free Encyclopedia, <https://en.wikipedia.org/wiki/sandbox_(computer_security)> [retrieved Jan. 26, 2016], 3 pages.

* cited by examiner

DATA STORAGE KEY ROTATION

BACKGROUND

Information security is an important aspect of providing a storage service. One of the ways in which stored information is secured is by using client-side encryption. In client-side encryption, the client computer system encrypts information to be stored using a cryptographic key, and transmits the encrypted information to the storage service. The storage service retains the encrypted information in encrypted form. In general, the unencrypted information is not accessible to the storage service. The client computer system can recover the information by retrieving the encrypted information from the storage service, and decrypting the encrypted information with the cryptographic key.

From time to time, it may be desirable or necessary to change the cryptographic key with which the information is secured. The process of changing the cryptographic key and updating the corresponding encrypted information is called key rotation. The client may perform key rotation by retrieving the encrypted information from the storage service, decrypting the encrypted information with an old cryptographic key, re-encrypting the decrypted information with a new cryptographic key, and transmitting the re-encrypted information to the storage service. As the amount of encrypted data stored on the storage service increases, key rotation becomes a more difficult and costly process. However, more frequent key rotation may also contribute to increased data security. Therefore, improving the ability of the client computer system to perform key rotation is an important problem.

BRIEF DESCRIPTION OF THE DRAWINGS

Various techniques will be described with reference to the drawings, in which.

DETAILED DESCRIPTION

Figure 1:
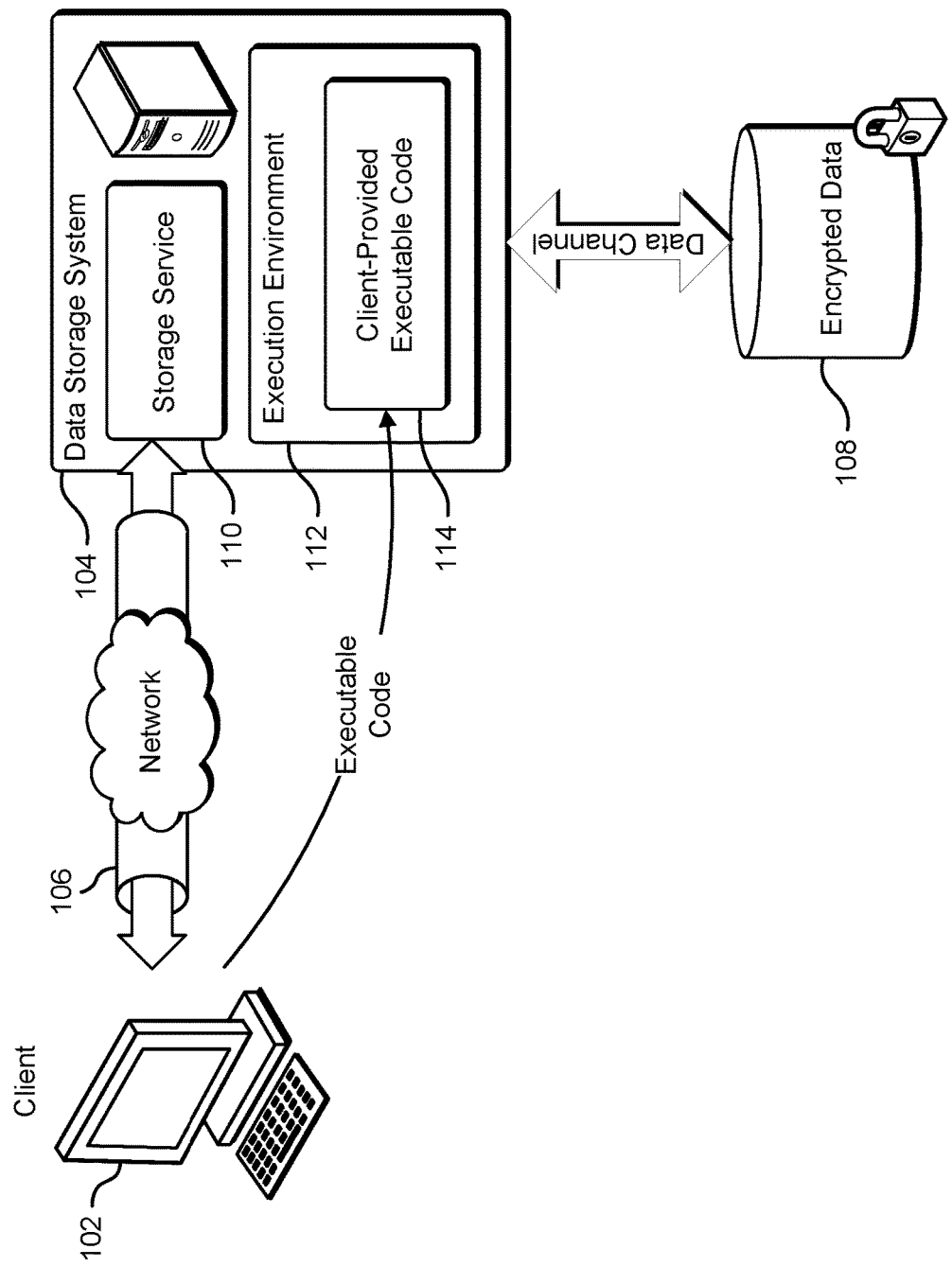
FIG. 1 shows an illustrative example of an environment in which various embodiments may be practiced.

The current document describes systems and methods that improve the operation of data storage systems by providing, to a client computer system, the ability to upload and execute client-provided code in a sandboxed execution environment within the data storage system. The client computer system can upload, to the execution environment, client-provided code that programmatically manipulates data stored on the data storage system without having to transfer the data to and from the client computer system. Client-provided code is particularly useful when the data storage system contains encrypted or encoded data. By uploading and initiating execution of client-provided code on the data storage system, the client computer system can cause the data storage system to transcode encoded data from one format to another, encrypt plaintext data, decrypt encrypted data, or re-encrypt encrypted data in accordance with key-rotation operations.

If the data storage system holds encrypted data, key-rotation operations can be costly and time-consuming if performed entirely by the client computer system. In one example, a client computer system encrypts data with a cryptographic key in accordance with a particular cryptographic algorithm, and transmits the encrypted data to a data storage system. The data storage system retains the encrypted data on a storage device such as a hard drive, optical disk, flash memory, or random access memory ("RAM"). The client computer system is able to retrieve the stored data by requesting the encrypted data from the data storage system and decrypting the encrypted data with the cryptographic key. If the cryptographic key with which the stored data is encrypted is changed, the stored data may be updated in accordance with the changed cryptographic key. The client computer system may update the stored data by reading the encrypted data from the data storage system, decrypting the encrypted data with the original cryptographic key, re-encrypting the data with the updated cryptographic key, and returning the re-encrypted data to the data storage system. If the amount of encrypted data maintained by the data storage system is large, rotating the cryptographic key used to encrypt the encrypted data results in a correspondingly large amount of data being exchanged between the client computer system and the data storage system.

The amount of data exchanged between the client computer system and the data storage system may be reduced or eliminated through use of an execution environment provided by the data storage system. The execution environment allows the client computer system to upload and execute operational instructions on the storage host system. The execution environment may be implemented as a sandboxed environment so that the operational instructions do not interfere with the internal operation of the data storage system, and do not interfere with the operation of operational instructions provided by other computer systems within other execution environments. For example, processes executing in the execution environment may operate in their own memory space, and may be provided with a separate processor state when using a shared processor on the data storage system. In various implementations, the execution environment may be implemented as an environment adapted to a particular programming language such as a JavaScript execution environment, a Perl execution environment, a Python execution environment, a Basic execution environment, or a Java virtual machine ("JVM"). The execution environment can be implemented as a scripting engine that supports an interpreted language. In another implementation, the execution environment is configured to execute object code, intermediate code, or executable code compiled from a variety of programming languages such as "C," "C++," Java, Pascal, or Ada. The execution environment may be restricted to accessing a limited subset of the data stored on the data storage system. For example, the execution environment may be restricted to accessing data owned by the client computer system that uploaded and initiated execution of client-provided code within the execution environment. The execution environment may be restricted to accessing a portion of the available storage space on the data storage system. For example, the execution environment may be restricted to accessing a data partition allocated to the client computer system associated with the client-provided code.

The client computer system can use the execution environment on the data storage system to perform key-rotation operations on encrypted data stored on the data storage system. In various examples, the client computer system stores encrypted data on the data storage system. Plaintext data is encrypted by the client computer system with a cryptographic key retained by the client computer system, and the resulting encrypted data is transmitted to the data storage system and stored. To recover the plaintext data, the client computer system retrieves the encrypted data from the data storage system and, using the retained cryptographic key, decrypts the encrypted data to reproduce the plaintext data. The encrypted data is encrypted in accordance with a cryptographic algorithm determined by the client computer system. In some implementations, the cryptographic key is a public-private key pair. The public key of the public-private key pair is used to encrypt data, and the private key of the public-private key pair is used to decrypt the data. In response to a compromise or expiration of the cryptographic key, the client computer system may generate a new cryptographic key, and/or change the cryptographic algorithm with which the data is encrypted.

As a result of having changed the cryptographic key and/or the cryptographic algorithm, the client computer system causes key-rotation operations to be performed by the data storage system. The key-rotation operations modify the encrypted data stored on the data storage system in accordance with the changes to the cryptographic key and/or the cryptographic algorithm. The client computer system accomplishes this by providing executable instructions, the original cryptographic key, and the new cryptographic key to the execution environment on the data storage system. The executable instructions are generated in a format that is compatible with the execution environment provided by the data storage system. The executable instructions, when executed within the execution environment: read the encrypted data retained by the storage host system into the execution environment; decrypt the encrypted data using the original cryptographic algorithm and the original cryptographic key to produce plaintext data; encrypt the plaintext data using the new cryptographic algorithm and the new cryptographic key; and store the re-encrypted plaintext data on the storage host system. In general, the encrypted data need not be transferred to or from the client computer system as part of the key-rotation operation.

In some embodiments, the cryptographic keys used to encrypt and decrypt the encrypted data on the data storage system are stored within a key management service. The key management service holds the cryptographic keys for the client computer system, and the client computer system permits access to the cryptographic keys by, at least in part, providing a key reference. The Key reference is provided by the client computer system to the key-rotation process executing within the execution environment. The key-rotation process accesses the cryptographic keys from the key management service using the key reference. The key management service may be configured to provide an encryption key and/or a decryption key to the key-rotation process. For example, if a public-private cryptographic key pair is used to encrypt and decrypt information on the data storage system, the private key of the public-private cryptographic key pair may be used for decryption operations, and the public key of the public-private cryptographic key pair may be used for encryption operations. In some examples, as a result of key-rotation operations, the key management service generates a new public-private key pair. The key management service provides, to the key-rotation process, the original private key for decryption of the data, and the new public key for encryption of the data. The private key of the new public-private key pair need not be exposed as part of the key-rotation process.

The capabilities provided by the execution environment on the data storage system can be used in combination with envelope encryption schemes. In envelope encryption, data is encrypted with an envelope key, and the envelope key is encrypted with a master key. The encrypted data and the encrypted envelope key can be stored or transmitted together, allowing a party with access to the master key to access the data by decrypting the envelope key and then using the envelope key to decrypt the data. In an envelope encryption scheme, key rotation can take the form of a shallow key rotation or a deep key rotation. In shallow key rotation, the master key is changed and the envelope key remains unchanged. Since the envelope key remains unchanged, the data need not be re-encrypted. In deep key rotation, the envelope key and the master key are changed, and the data is re-encrypted with the new envelope key. In general, performing shallow key rotation requires fewer computational resources and can be performed in less time than deep key rotation.

Envelope encryption can be implemented in the context of a data storage system. In a data storage system, the envelope key of the envelope encryption scheme can be stored within the data storage system, and the master key of the envelope encryption scheme can be maintained by the client computer system. The envelope keys are encrypted using one or more master keys that are generally retained by the client computer system. The client computer system accesses data on the data storage system by retrieving encrypted data along with an associated envelope key from the data storage system. Using the master key, the client computer system decrypts the envelope key, and uses the envelope key to decrypt the encrypted data. The client computer system can write data to the data storage system by generating an envelope key, encrypting data to be written with the envelope key, encrypting the envelope key with the master key, and storing the encrypted data along with the encrypted envelope key on the data storage system.

Shallow and deep key rotation may be performed in part by uploading and initiating executable instructions to the execution environment of the data storage system. In one example, a data storage system maintains a set of envelope keys which are encrypted with a master key. The master key is a public-private key pair where the public key of the public-private key pair is used to encrypt the set of envelope keys, and the private key of the public-private key pair is used to decrypt the set of envelope keys. The client computer system performs shallow key rotation by uploading, to the execution environment, executable instructions that when executed, re-encrypt the envelope keys with a new master key generated by the client. In addition to the executable instructions, the client computer system provides the private key of the original master key, and the public key of the new master key. The private key of the new master key is not needed to perform key rotation, and can be retained by the client computer system. Since the envelope keys are not changed, the associated encrypted data does not need to be re-encrypted.

If deep key rotation is performed, the executable instructions are adjusted to perform additional operations. In one implementation, after decrypting the envelope keys with the old master key, but before re-encrypting the envelope keys with the new master key, deep key rotation is accomplished by generating new envelope keys, decrypting the encrypted stored data with the original envelope keys, encrypting the stored data with the new envelope keys, and storing the re-encrypted data on the data storage system. The private key of the new master key is not needed to perform deep key rotation.

When the execution environment is used to perform cryptographic operations, once the requested operation is complete, the execution environment may be cleaned to remove evidence of cryptographic keys, unencrypted data, or other sensitive information. For example, sensitive information may be removed by the zeroing out memory allocated to the execution environment before the memory is released to other processes. Cryptographic keys such as master keys, envelope keys, or other keys are deleted. Executable instructions may be deleted or hidden to conceal the algorithms used to encrypt or decrypt data stored on the data storage system.

Information including executable code, cryptographic keys, encrypted data, and plaintext data, may be exchanged between the client computer system and the data storage system over a variety of communication channels. In some examples, information is exchanged between the client computer system and data storage system over a secure network connection such as a TLS network connection. In another example, information is exchanged between the client computer system and the data storage system via inter-process communication ("IPC"). In yet another example, information is exchanged between the client computer system and the data storage system via an inter-container communication channel.

FIG. 1 shows an illustrative example of an environment in which various embodiments may be practiced. A system diagram 100 shows a client computer system 102 that communicates with a data storage system 104 via a network connection 106. The client computer system 102 uses the data storage system 104 to hold encrypted data. The encrypted data is retained by the data storage system 104 on a data storage device 108. The data storage device 108 can be a disk drive, a flash memory drive, an optical disk drive, a nonvolatile random access memory, or other data storage device. The data storage device 108 communicates with the data storage system 104 over a data channel. The data channel can be a SATA connection, a SCSI connection, an SAS interface connection, a Fibre Channel ("FC") connection, a USB connection, a fiber optic connection, a network connection, a parallel data interface connection, a serial data connection, or other data transmission channel. In many examples, the data throughput capability of the data channel is substantially greater than the data throughput capability of the network connection 106.

The data storage system 104 is a computer system that includes a data storage service 110. The data storage service 110 makes data storage services available to one or more client computer systems via a network interface on the data storage system 104. The data storage system 104 may have a variety of form factors. For example, in some implementations, the data storage system 104 is a network-attached storage ("NAS") appliance. In another example, the data storage system 104 is a disk controller and the data storage device 108 is a disk mechanism associated with the disk controller. In some implementations, the data storage service 110 provides storage services to the client computer system via a USB interface, a FireWire interface, or a Storage Area Network ("SAN") interface. The client computer system provides data to the data storage service 110, which in turn writes the data to the data storage device 108. The data storage service 110 may operate in accordance with a number of network file system protocols such as Server Message Block ("SMB"), Network File System ("NFS"), or ATA over Ethernet ("AoE") protocols.

The data storage system 104 includes an execution environment 112 which is made accessible to the client computer system 102. The client computer system 102 may upload executable code to the execution environment 112, and may initiate execution of the executable code by the data storage system 104. The execution environment 112 can be a virtual machine, script engine, computer language interpreter, or physical processor. In some implementations, the execution environment 112 is sandboxed to protect other components of the data storage system 104 from the effects of code executing within the execution environment 112. The client computer system 102 is able to upload executable code 114 into the execution environment 112. Based at least in part on properties of the execution environment 112, the executable code 114 may be in the form of compiled instructions, JavaScript, Perl, "C" source code, Java code, intermediate object code, or any other format which is compatible with the execution environment 112. Initiation of the executable code 114 by the client computer system 102 causes the data storage system 104 to execute, within the execution environment 112, the uploaded executable code 114.

The executable code 114 provided by the client computer system 102 may be used to read, modify, and store data stored on the data storage device 108. For example, data can be read from the data storage device 108 into the execution environment 112, modified by execution of the executable code 114, and then the modified data can be returned to the data storage device 108. In various examples, executable code provided by a client computer system can be used to improve the operation of key rotation processes, and data transcoding processes.

Figure 2:
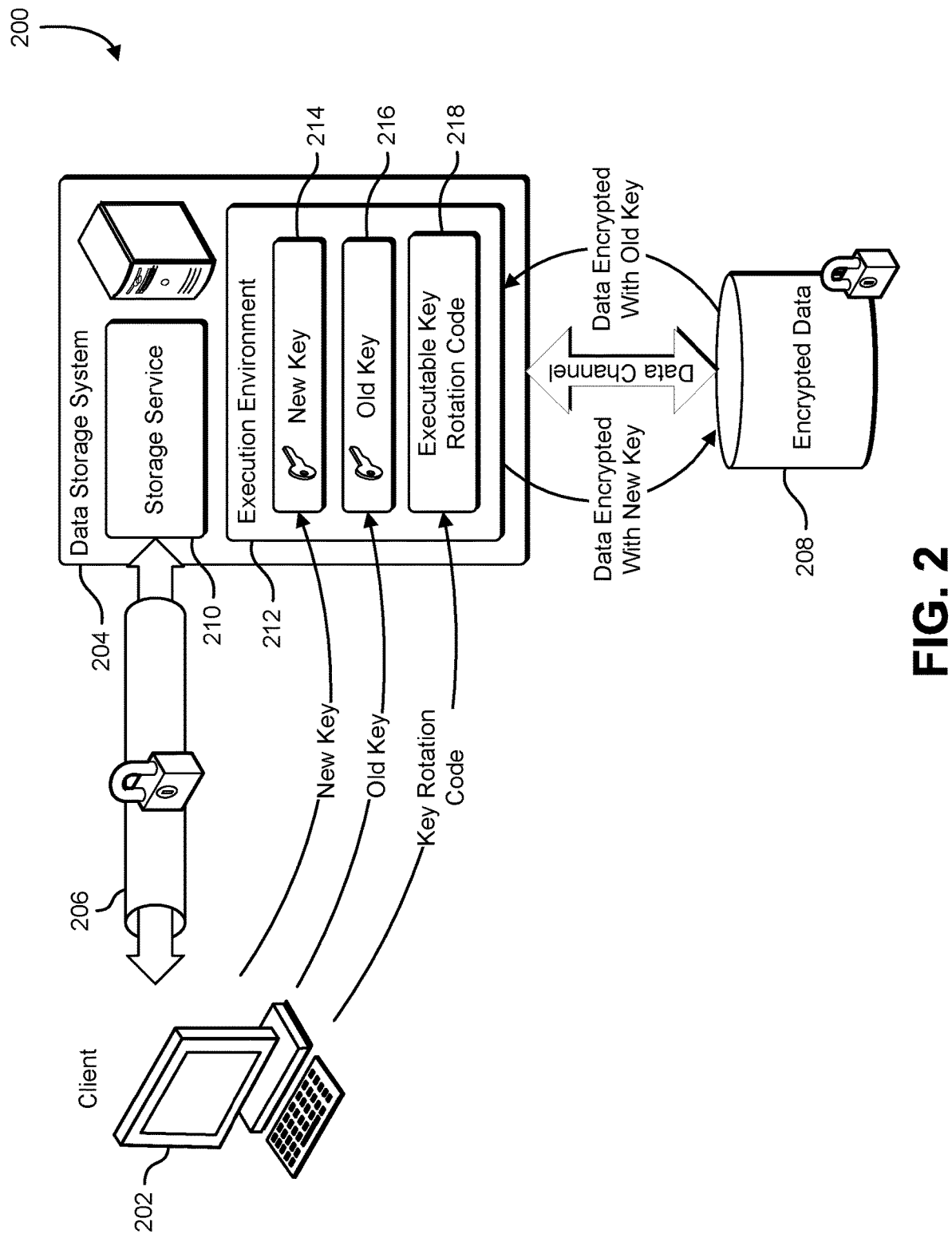
FIG. 2 shows an illustrative example of a storage host system that includes an execution environment for performing key-rotation operations on stored encrypted data.

FIG. 2 shows an illustrative example of a storage host system that includes an execution environment for performing key-rotation operations on stored encrypted data. A system diagram 200 shows a client computer system 202 that communicates with a data storage system 204 via a secure network connection 206. The client computer system 202 stores, on the data storage system 204, encrypted data which is encrypted with a cryptographic key. The cryptographic key may be a symmetric cryptographic key or an asymmetric cryptographic key pair. The encrypted data is retained by the data storage system 204 on a data storage device 208. The data storage system 204 includes a data storage service 210 that provides data storage services to client computer systems via a network interface on the data storage system 204. The client computer system 202 connects to the data storage service 210 via the secure network connection 206, and uses the data storage service 210 to store and retrieve encrypted data. As a result, the data storage system 204, at the direction of the data storage service 210, stores and retrieves the encrypted data on the data storage device 208.

The data storage system 204 includes an execution environment 212 which is made accessible to the client computer system 202. In some implementations, the execution environment 212 is made available to the client computer system via the data storage service 210. In another implementation, the execution environment 212 is made available to the client computer system via a separate network service. The execution environment 212 can be a virtual machine, script engine, computer language interpreter, or physical processor. The execution environment 212 is sandboxed to protect other components of the data storage system 204 from the effects of code executing within the execution environment 212. For example, executable code uploaded into the execution environment 212 by a first client computer system may be limited to accessing data that was stored on the data storage device 208 by the first client computer system. The client computer system 202 is able to upload and initiate compatible executable code into the execution environment 212.

In FIG. 2, the capabilities provided by the execution environment 212 are used to perform operations associated with the rotation of cryptographic keys. In various examples, the client computer system 202 stores encrypted data on the data storage system 204. The data is encrypted with a cryptographic key, which is under the control of the client computer system 202. The client computer system 202 stores encrypted data on the data storage system 204 by encrypting the data using the cryptographic key, and transferring the resulting encrypted data to the data storage service 210 on the data storage system 204. The data storage service 210 allocates storage space on the data storage device 208, and transfers the encrypted data to the allocated storage space. The client computer system 202 can retrieve the data from the data storage system 204 by requesting the encrypted data from the data storage service 210. In response, the data storage service 210 retrieves the encrypted data from the data storage device 208 and returns the encrypted data to the client computer system 202. The client computer system, using the cryptographic key, decrypts the encrypted data to recover the plaintext data.

If the client computer system 202 changes the cryptographic key (hereinafter called the old cryptographic key) to a new cryptographic key, the encrypted data on the data storage device 208 is updated in accordance with the new cryptographic key. The client computer system 202 updates the encrypted information retained on the data storage system 204 by uploading the new cryptographic key 214, the old cryptographic key 216, and key rotation code 218 to the execution environment 212. The client computer system 202 initiates execution of the key rotation code 218 within the execution environment 212. The execution of the key rotation code 218 causes the encrypted data to be retrieved from the data storage device 208 into the execution environment 212. The encrypted data is decrypted using the old cryptographic key 216 and then encrypted with the new cryptographic key 214. The resulting re-encrypted data is stored on the data storage device 208.

The encrypted data stored on the data storage device 208 may be encrypted with a cryptographic key that is a public-private key pair. The public key of the public-private key pair is used to encrypt data, and the private key of the public-private key pair is used to decrypt data. If the client computer system 202 generates a new cryptographic key, the new cryptographic key 214 provided to the execution environment 212 need contain only the public key of the new cryptographic key. The private key of the new cryptographic key may be retained by the client computer system 202. The old cryptographic key 216 provided to the execution environment 212 includes the private key associated with the old cryptographic key. Once the key rotation operations are complete, the execution environment 212 is scrubbed to remove the cryptographic keys, unencrypted data, and data encrypted with the old cryptographic key. In some examples, a new cryptographic key may be generated within the execution environment 212 by execution of the key rotation code 218, and the new cryptographic key provided to the client computer system 202.

In some embodiments, data stored on the data storage system 204 may be transcoded using executable instructions uploaded into the execution environment 212 by the client computer system 202. For example, data stored on the data storage device 208 may be converted from one audio format to another audio format, from a particular video format to another video format, or from one document format to another document format. By uploading and initiating appropriate executable instructions to the execution environment 212, the client computer system 202 can cause the data storage system 204 to read data from the data storage device 208, convert the data from one format to another format, and return the converted data to the data storage device 208. The data can be converted without the need to transfer the data from the data storage system 204 to the client computer system 202 and back to the data storage system 204. In some implementations, the client computer system 202 offloads a portion of the conversion operations to the execution environment 212, and performs another portion of the conversion operations on the client computer system 202.

Figure 3:
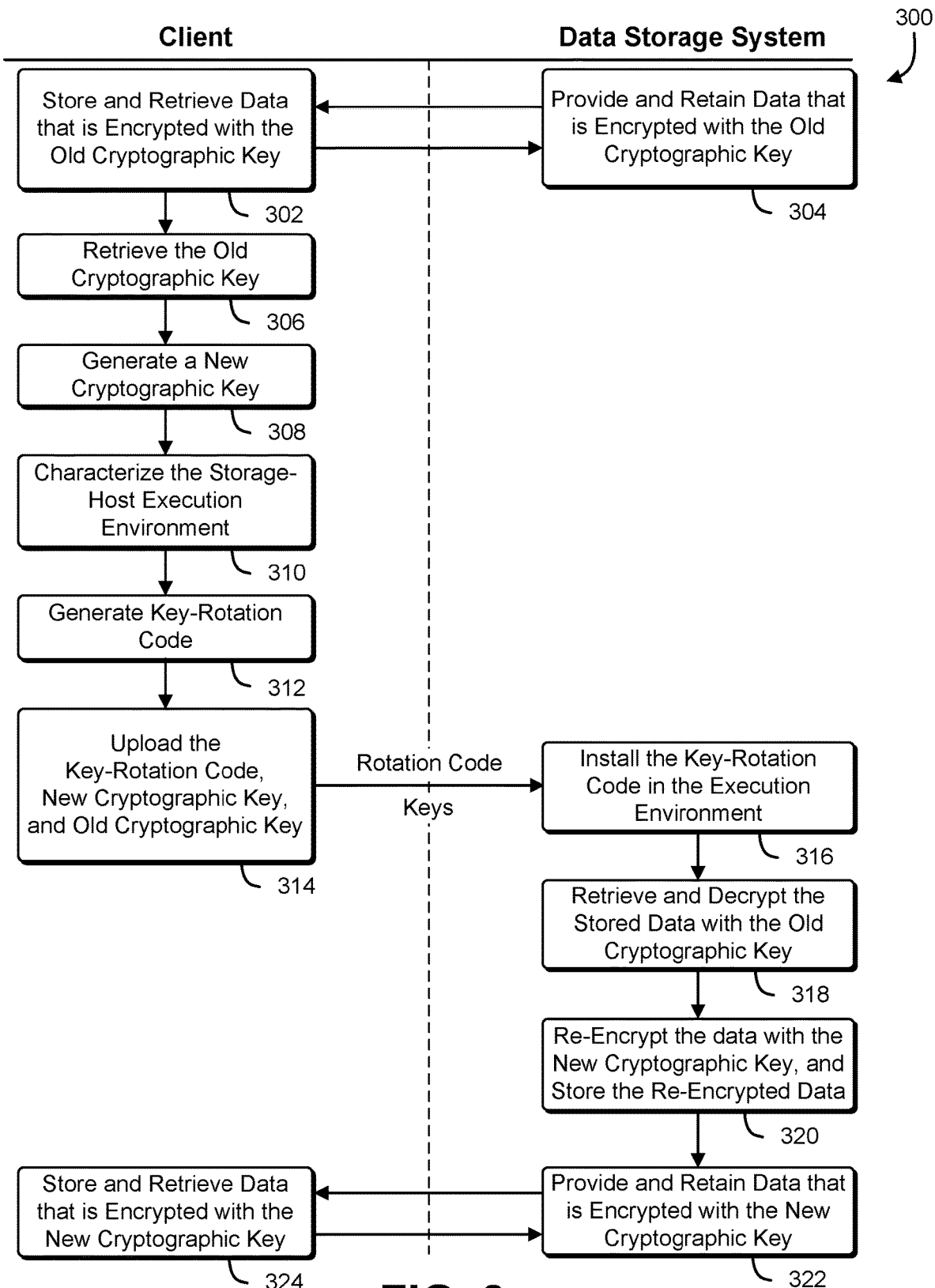
FIG. 3 shows an illustrative example of a process that, as a result of being performed by a client computer system and a storage host, performs key rotation for encrypted data by in part re-encrypting the encrypted data with a new cryptographic key.

FIG. 3 shows an illustrative example of a process that, as a result of being performed by a client computer system and a storage host, performs key rotation for encrypted data by in part re-encrypting the encrypted data with a new cryptographic key. A swim diagram 300 illustrates a process that begins with the client computer system storing and retrieving 302 encrypted data to and from the data storage system. The encrypted data is encrypted with an old cryptographic key. The data storage system, at the request of the client computer system, provides or retains 304 the encrypted data.

The client computer system may initiate key rotation for a variety of reasons. In some examples, the client computer system initiates key rotation as a result of detecting that an in-use cryptographic key has been compromised. In another example, the client computer initiates key rotation based at least in part on an expiration of the cryptographic key. The expiration may be based at least in part on the age of the cryptographic key, or the amount of data encrypted with a cryptographic key.

As a result of the client computer initiating key rotation, the client computer system retrieves 306 the old cryptographic key, and retains the old cryptographic key for use during key rotation. At block 308, the client computer system generates a new cryptographic key to replace the old cryptographic key. At block 310, the client computer system determines the characteristics of the execution environment on the data storage system. Based at least in part on the characteristics of the execution environment, the client computer system generates 312 key-rotation code that is compatible with the execution environment on the data storage system. At block 314, the client computer system uploads the key-rotation code, the new cryptographic key, and the old cryptographic key, to the data storage system.

The data storage system receives the key-rotation code from the client computer system, and installs 316 the key-rotation code into the execution environment. The key-rotation code is executed within the context of the execution environment by the data storage system, which causes the data storage system to retrieve 318 encrypted data from a data storage device connected to the data storage system, and decrypt the encrypted data with the old cryptographic key. At block 320, the execution of the key-rotation code causes the data storage system to re-encrypt the decrypted data with the new cryptographic key, and store the re-encrypted data to a data storage device connected to the data storage system.

At block 322, the data storage system holds data that is encrypted with the new cryptographic key. Upon request from the client computer system, the data storage system provides and retains data that is encrypted with the new cryptographic key. The client computer system may delete the old cryptographic key. At block 324, the client computer system stores and retrieves data that is encrypted with the new cryptographic key.

Figure 4:
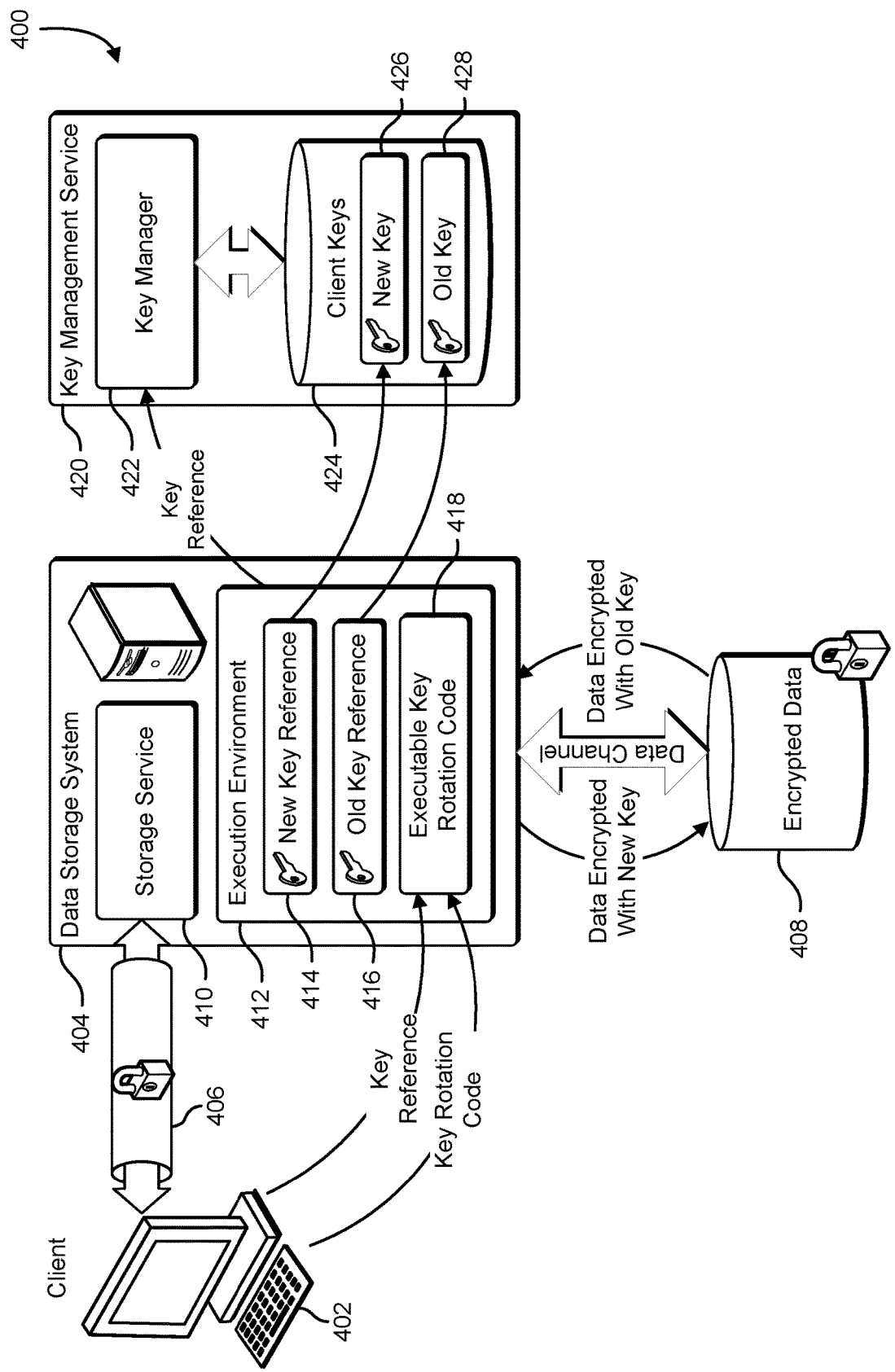
FIG. 4 shows an illustrative example of a storage host system that includes an execution environment for performing key-rotation operations on stored encrypted data, and a key management service for maintaining cryptographic keys associated with the encrypted data.

FIG. 4 shows an illustrative example of a storage host system that includes an execution environment for performing key-rotation operations on stored encrypted data, and a key management service for maintaining cryptographic keys associated with the encrypted data. A system diagram 400 shows a client computer system 402 that communicates with a data storage system 404 via a secure network connection 406. The client computer system 402 stores, on the data storage system 404, encrypted data which is encrypted with a cryptographic key. The cryptographic key is maintained within a key management service 420. The cryptographic key may be a symmetric cryptographic key or an asymmetric cryptographic key pair. The encrypted data is retained by the data storage system 404 on a data storage device 408. The data storage system 404 includes a data storage service 410, and the data storage service 410 provides data storage services to client computer systems via a network interface on the data storage system 404. The client computer system 402 connects to the data storage service 410 via the secure network connection 406, and uses the data storage service 410 to store and retrieve encrypted data. As a result, the data storage system 404, under the control of the data storage service 410, stores and retrieves the encrypted data on the data storage device 408.

The data storage system 404 includes an execution environment 412 which is accessible to the client computer system 402. In some implementations, the execution environment 412 is accessible to the client computer system via the data storage service 410. In another implementation, the execution environment 412 is made available to the client computer system via a separate network service. The execution environment 412 can be a virtual machine, script engine, computer language interpreter, or physical processor. The execution environment 412 may be sandboxed to protect other components of the data storage system 404 from the effects of code executing within the execution environment 412. For example, executable code uploaded into the execution environment 412 by a first client computer system may be limited to accessing data that was stored on the data storage device 408 by the first client computer system. The client computer system 402 is able to upload and initiate compatible executable code into the execution environment 412. By deploying key rotation code 418 to the execution environment 412, the client computer system 402 causes the data storage system 404 to perform operations associated with the rotation of cryptographic keys.

In various examples, the client computer system 402 stores encrypted data on the data storage system 404. The data is encrypted with a cryptographic key that is maintained by a key management service 420. The key management service 420 includes a key manager 422 and a key database 424. Cryptographic keys held by the key management service 420 are usable by supplying a corresponding key reference to the key manager 422. In some embodiments, the key manager 422 authenticates the request for the cryptographic key, and returns, to the requester, the cryptographic key associated with the key reference. In another embodiment, the key manager 422 authenticates the request for the cryptographic key, and performs the requested cryptographic operation using the cryptographic key identified by the key reference. During key rotation, the key database 424 holds a new cryptographic key 426 and an old cryptographic key 428. The new cryptographic key 426 is generated by the key management service 420, and the key management service 420 provides a new cryptographic key reference 414 to the data storage system 404. An old cryptographic key reference 416 is provided by the client computer system 402, and is used by the data storage system 404 to access the old cryptographic key 428.

The client computer system 402 stores encrypted data on the data storage system 404 by encrypting the data using the cryptographic key, and transferring the resulting encrypted data to the data storage service 410 on the data storage system 404. In some implementations, the data is encrypted by the key management service 420. In other implementations, the cryptographic key is retrieved from the key management service 420 and the data is encrypted on the client computer system 402. The data storage service 410 allocates storage space on the data storage device 408, and stores the encrypted data to the allocated storage space. The client computer system 402 retrieves the data from the data storage system 404 by requesting the encrypted data from the data storage service 410. The data storage service 410 retrieves the encrypted data from the data storage device 408 and returns the encrypted data to the client computer system 402. In some implementations, the client computer system retrieves the cryptographic key from the key management service 420, and using the cryptographic key, decrypts the encrypted data to recover the plaintext data. In other implementations, the client computer system 402 provides the encrypted data to the key management service 420, which decrypts the encrypted data using the cryptographic key, and returns the plaintext data to the client computer system 402.

The client computer system 402 can cause the key management service 420 to generate a new cryptographic key that replaces the cryptographic key (hereinafter called the old cryptographic key). If a new cryptographic key is generated, the client computer system 402 updates the encrypted information retained on the data storage system 404 by uploading a new cryptographic key reference 414, the old cryptographic key reference 416, and key rotation code 418 to the execution environment 412. The client computer system 402 initiates execution of the key rotation code 418 within the execution environment 412. The execution of the key rotation code 418 causes the encrypted data to be retrieved from the data storage device 408 into the execution environment 412. The encrypted data is decrypted by the key management service 420 using the old cryptographic key 428. The decrypted data is then encrypted by the key management service 420 with the new cryptographic key 426. The resulting re-encrypted data is stored on the data storage device 408.

Figure 5:
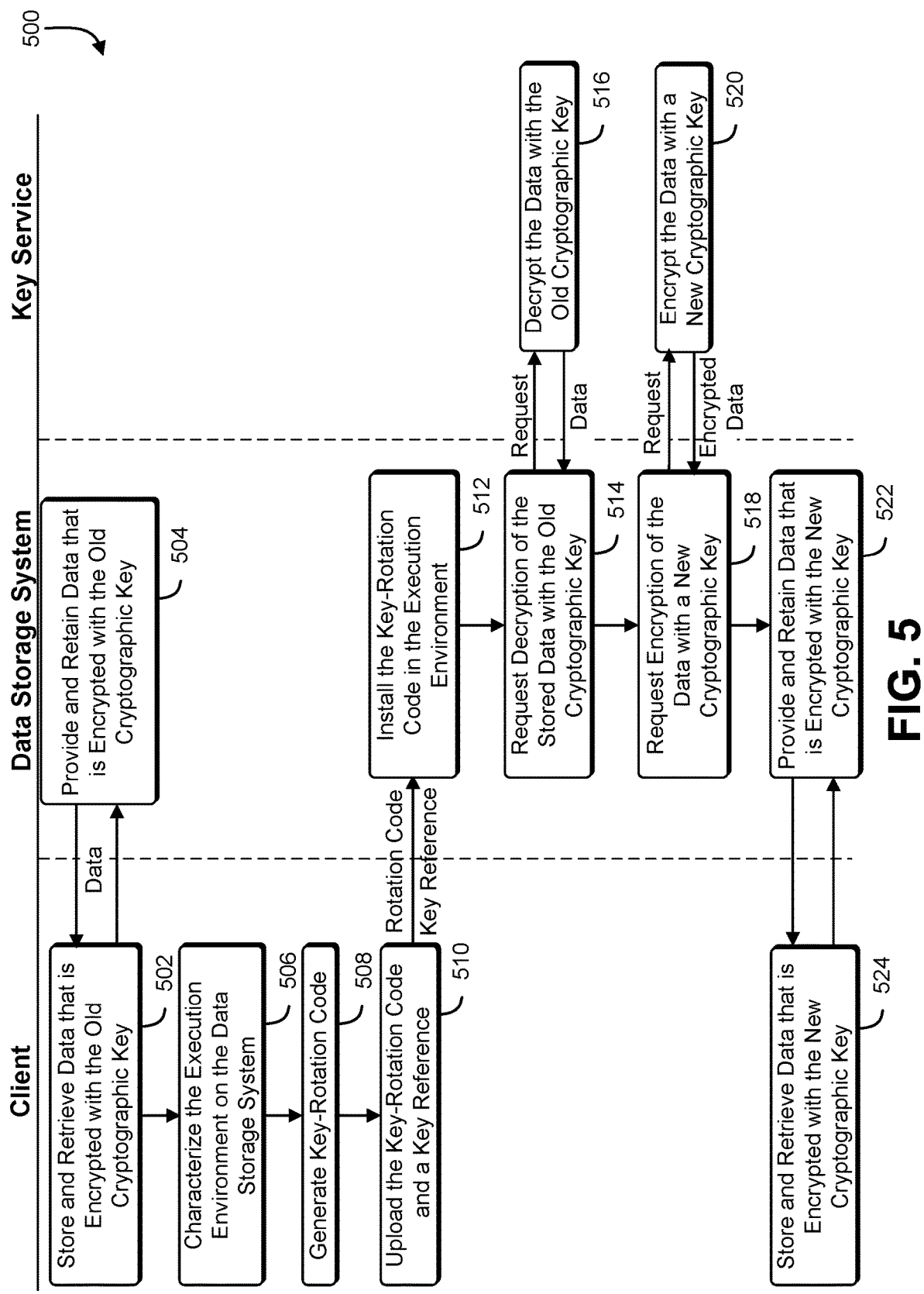
FIG. 5 shows an illustrative example of a process that, as a result of being performed by a client computer system, a storage host, and a key management service, performs key rotation for encrypted data by in part re-encrypting the encrypted data with cryptographic keys managed by the key management service.

FIG. 5 shows an illustrative example of a process that, as a result of being performed by a client computer system, a storage host, and a key management service, performs key rotation for encrypted data by in part re-encrypting the encrypted data with cryptographic keys managed by the key management service. A swim diagram 500 illustrates a process that begins at block 502, where a client computer system stores and retrieves the encrypted data on the data storage system. The encrypted data is encrypted using an old cryptographic key. The data storage system provides and retains 504 the encrypted data in response to requests from the client computer system.

As a result of key rotation being initiated, the client computer system determines 506 the characteristics of an execution environment provided by the data storage system. At block 508, the client computer system generates key rotation code to be used in supporting the key rotation operation. The key rotation code is adapted to the characteristics of the execution environment. For example, if the execution environment is a JavaScript environment, the key rotation code is generated in a JavaScript format. At block 510, the client computer system uploads the key rotation code and a key reference to the data storage system.

The key rotation code and the key reference are installed 512 in the execution environment on the data storage system. The key rotation code is executed by the data storage system in the context of the execution environment. As a result, the data storage system requests, from the key management service, 514 decryption of the data stored in the data storage system. The data storage system provides the key management service with the encrypted data, and a reference to the old cryptographic key. The key management service authorizes the request, and decrypts 516 the encrypted data using the old cryptographic key held by the key management service. The decrypted data is returned by the key management service to the data storage system.

At block 518, the data storage system requests, from the key management service, encryption of the data with the new cryptographic key. In some implementations, where the new cryptographic key has been previously generated by the key management service, the data storage system provides the key management service with the unencrypted data and a reference to the new cryptographic key. In other implementations, the data storage system provides the key management service with the unencrypted data, and the key management service generates a new cryptographic key, a reference to the new cryptographic key being provided to the client computer system. The key management service authorizes the request, and encrypts 520 the data with the new cryptographic key which is held by the key management service. The key management service returns the encrypted data to the data storage system, and the data storage system stores the encrypted data on a data storage device.

Once the data held by the data storage system is re-encrypted, the data storage service provides and retains 522 encrypted data which is encrypted with the new cryptographic key. At block 524, the client computer system stores and retrieves data that is encrypted with a new cryptographic key.

Figure 6:
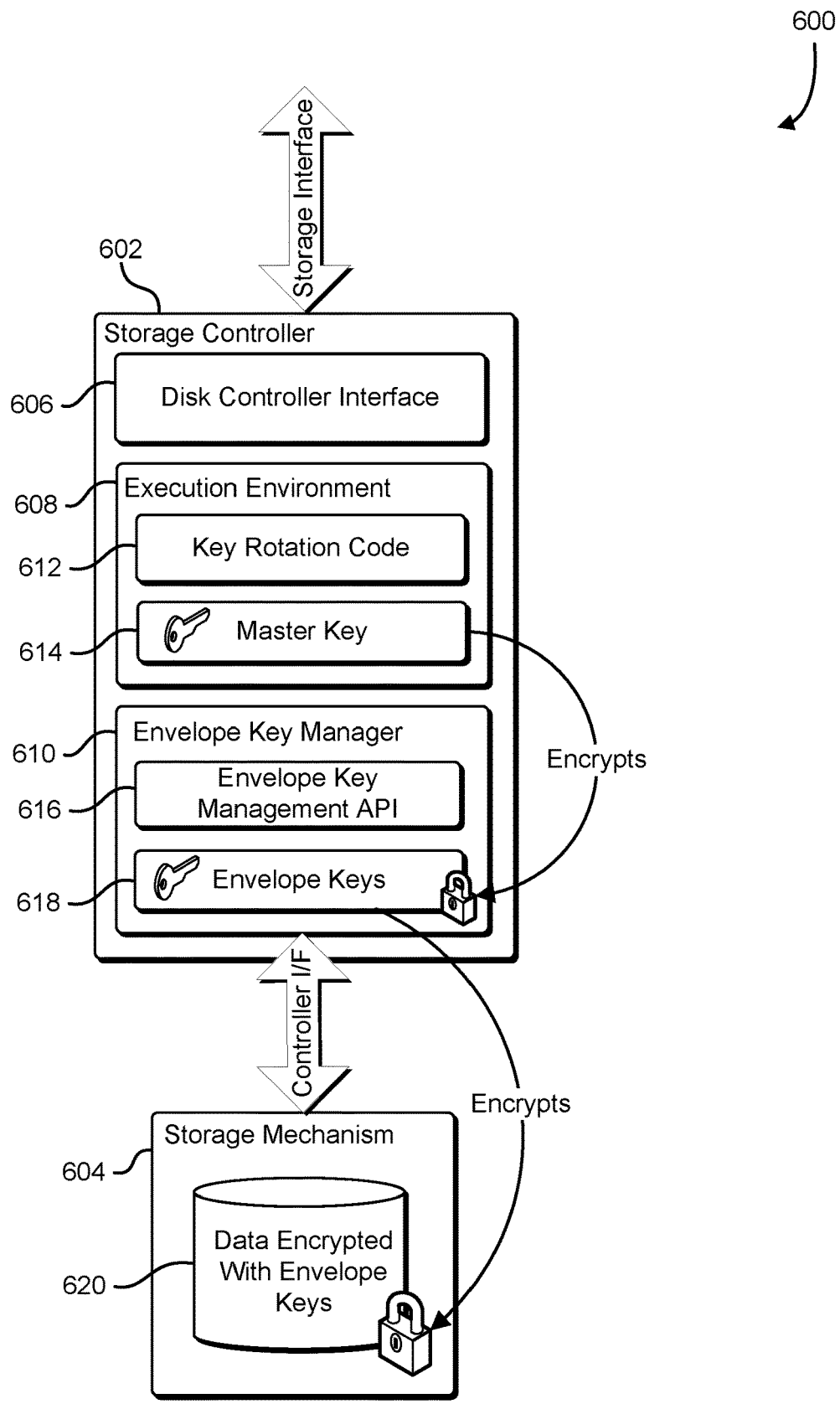
FIG. 6 shows an illustrative example of a storage controller that supports hierarchical cryptographic keys for key-rotation operations on stored encrypted data.

FIG. 6 shows an illustrative example of a storage controller that supports hierarchical cryptographic keys for key-rotation operations on stored encrypted data. A system diagram 600 includes a storage controller 602 and a storage mechanism 604. The storage controller 602 provides data storage to client computer systems via a storage interface. In some examples, the storage controller 602 is a disk drive controller that provides storage services to client computer systems via a serial ATA ("SATA") interface. The storage controller 602 is a computer system that includes a disk controller interface 606, the execution environment 608, and an envelope key manager 610. The execution environment 608 is an execution environment for client-provided code. In the illustrated example, the execution environment 608 includes key rotation code 612, and a master key 614. When executed, the key rotation code 612 can cause the storage controller 602 to perform either shallow key encryption or deep key encryption operations.

The envelope key manager 610 implements an envelope key management API 616, and maintains a set of envelope keys 618 that are encrypted with the master key 614. The set of envelope keys 618 are used to encrypt encrypted data 620, and the encrypted data 620 is retained on the storage mechanism 604. In some implementations, the set of envelope keys 618 is retained on the storage mechanism 604 with the encrypted data 620. The set of envelope keys 618 is arranged so that distinct portions of the data storage space provided by the storage mechanism 604 are encrypted by individual keys within the set of envelope keys 618. For example, individual keys within the set of envelope keys 618 may be used to encrypt a particular addressable range of storage space of the storage mechanism 604. In another example, individual keys within the set of envelope keys 618 may be used to encrypt a particular file stored on the storage mechanism 604. In yet another example, individual keys within the set of envelope keys 618 may be used to encrypt files within a particular directory on the storage mechanism 604. Envelope key management API 616 maintains information that identifies the particular envelope key of the set of envelope keys 618 that is necessary for decrypting particular information stored on the storage mechanism 604.

When a client computer system requests stored data from the storage controller 602, the disk controller interface 606 processes the request, and identifies the requested data on the storage mechanism 604. The requested data is retrieved from the storage mechanism 604, in encrypted form, and encrypted with one or more of the envelope keys in the set of envelope keys 618. The envelope key management API 616 identifies the applicable envelope keys, and returns the applicable envelope keys to the disk controller interface 606. The disk controller interface 606 returns the encrypted data and the applicable envelope keys to the client computer system. The client computer system uses a master key to decrypt the envelope keys, and then uses the envelope keys to decrypt the encrypted data.

When a client computer system stores data to the storage controller 602, the client computer system generates a new envelope key, encrypts the data with the envelope key, and encrypts the envelope key with the master key. The encrypted data and the encrypted envelope key are provided to the disk controller interface 606. The disk controller interface provides the envelope key to the envelope key management API 616 which retains the envelope key in the set of envelope keys 618. The encrypted data is written to the storage mechanism 604.

The execution environment 608 can be used to perform shallow key rotation or deep key rotation within the context of the execution environment 608. In shallow key rotation, the master key is changed, and the envelope keys within the set of envelope keys 618 are re-encrypted in accordance with the new master key. In deep key rotation, the master key and the keys within the set of envelope keys 618 are changed. The envelope keys 618 are changed in accordance with the change to the master key, and the encrypted data 620 is re-encrypted in accordance with the changed envelope keys. In various examples, some or all of the envelope keys in the set of envelope keys 618 may be changed. If some of the envelope keys are not changed, encrypted data associated with the unchanged envelope keys is not re-encrypted. In some situations, the envelope keys may be changed, but the master key may be unchanged.

Figure 7:
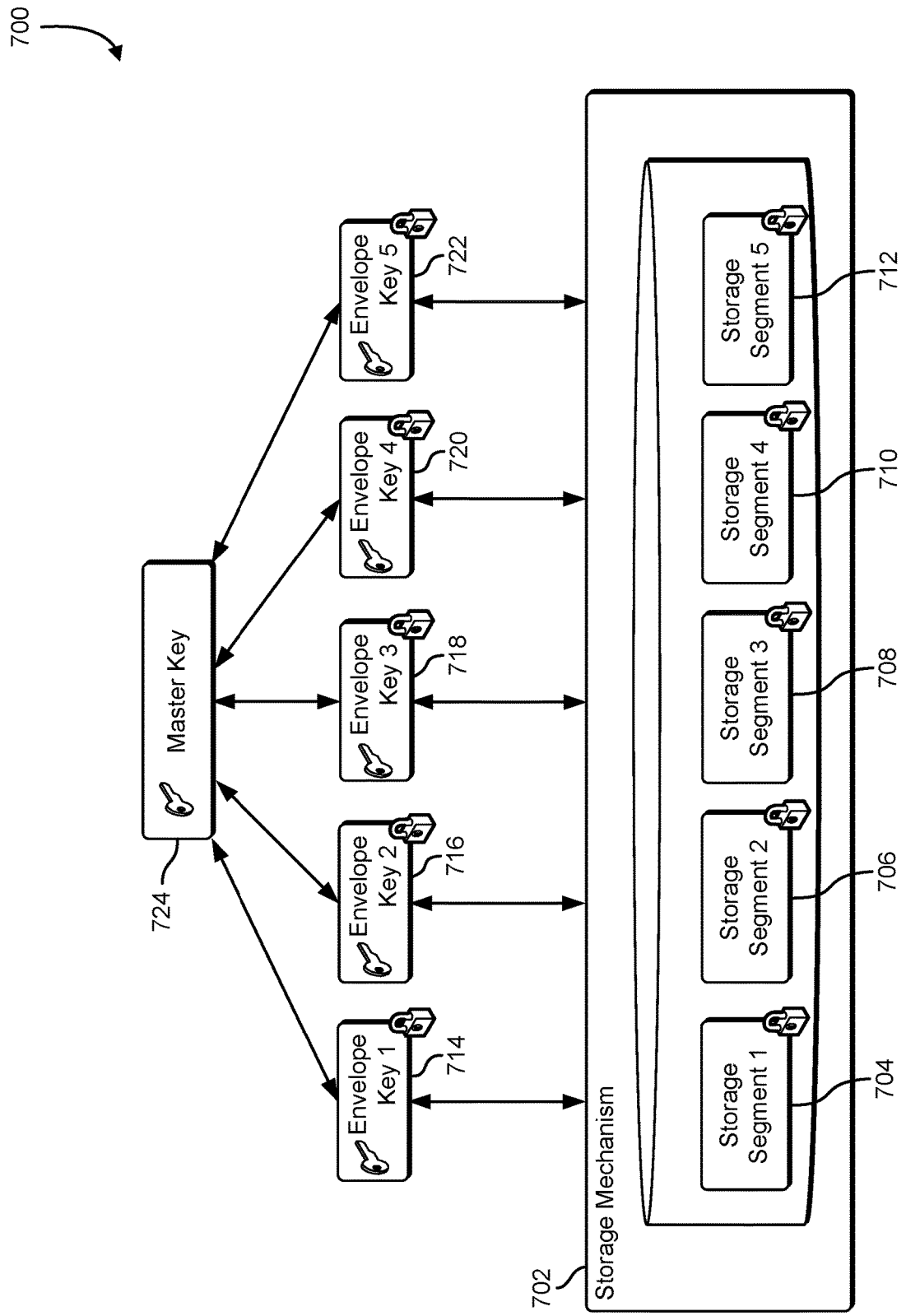
FIG. 7 shows an illustrative example of hierarchical cryptographic keys that enable a storage controller to support shallow and deep key-rotation operations on stored encrypted data.

FIG. 7 shows an illustrative example of hierarchical cryptographic keys that enable a storage controller to support shallow and deep key-rotation operations on stored encrypted data. A data diagram 700 includes a storage mechanism 702. The storage mechanism 702 includes a number of storage segments. In the example shown in FIG. 7, the storage mechanism 702 includes a first storage segment 704, a second storage segment 706, the third storage segment 708, a fourth storage segment 710, and a fifth storage segment 712. The storage segments are associated with individual envelope keys from a set of envelope keys. The set of envelope keys includes a first envelope key 714, a second envelope key 716, a third envelope key 718, a fourth envelope key 720, and a fifth envelope key 722.

Data within the storage mechanism 702 is encrypted with various keys from the set of envelope keys. Data within the first storage segment 704 is encrypted with the first envelope key 714. Data within the second storage segment 706 is encrypted with the second envelope key 716. Data within the third storage segment 708 is encrypted with the third envelope key 718. Data within the fourth storage segment 710 is encrypted with the fourth envelope key 720. Data within the fifth storage segment 712 is encrypted with the fifth envelope key 722. Each envelope key in the set of envelope keys is encrypted with a master key 724. In various embodiments, the set of envelope keys is retained within a data storage system. In some examples, the set of envelope keys is retained in flash storage on a disk controller, and data encrypted with the envelope keys stored on a disk mechanism controlled by the disk controller. In another example, the set of envelope keys is retained on a storage mechanism along with the data that is encrypted with the envelope keys. In general, the master key 724 is retained by a client computer system. In some situations, the master key 724 may be provided to a data storage system, or an execution environment within the data storage system, for the purpose of performing key rotation operations.

Figure 8:
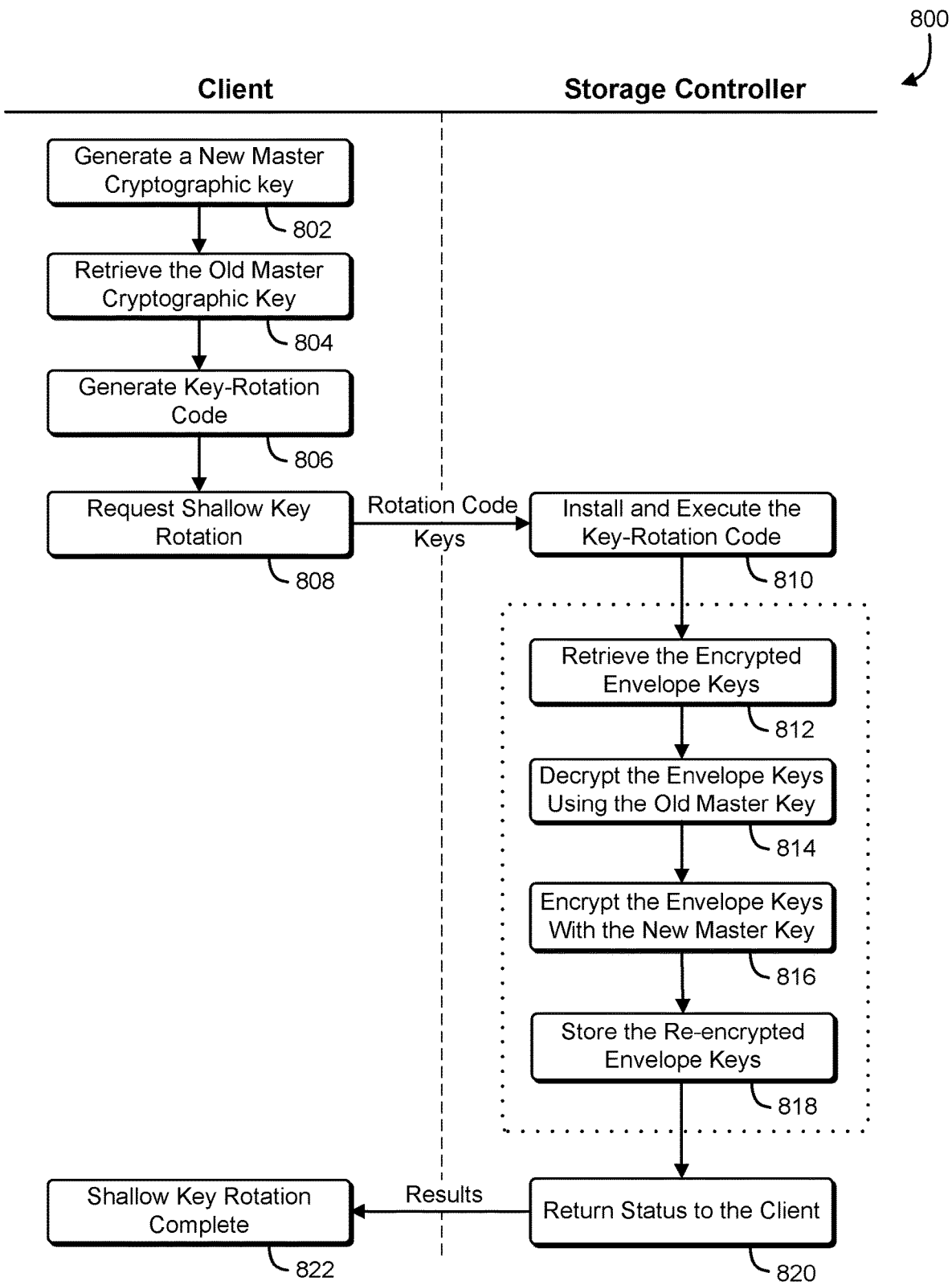
FIG. 8 shows an illustrative example of a process that, as a result of being performed by a client computer system and a storage controller, performs shallow key rotation.

FIG. 8 shows an illustrative example of a process that, as a result of being performed by a client computer system and a storage controller, performs shallow key rotation. A swim diagram 800 illustrates a process that begins at block 802 with the client computer system generating a new master cryptographic key. The new master cryptographic key will be used to encrypt the envelope keys which encrypt the stored data. At block 804, the client computer system retrieves an old master cryptographic key. The old master cryptographic key is the cryptographic key that currently encrypts the envelope keys. At block 806, the client computer system generates a key rotation code to be uploaded to an execution environment on the storage controller. At block 808, the client computer system assembles a request for shallow key rotation. The request includes the key rotation code, the old master key, and the new master key. If the master key is an asymmetric cryptographic key, the request includes the private key associated with the old master key and the public key associated with the new master key. The private key of the new master key is retained by the client computer system. The assembled request is submitted to the storage controller.

At block 810, the storage controller receives the shallow key rotation request from the client computer system. The storage controller installs the shallow key rotation code into the execution environment, and initiates execution of the shallow key rotation code within the context of the execution environment. The operations shown within the dotted line on FIG. 8 are performed as a result of executing the shallow key rotation code within the context of the execution environment. At block 812, the storage controller retrieves the encrypted envelope keys. The envelope keys are decrypted 814 using the old master cryptographic key provided by the client computer system. At block 816, the envelope keys are re-encrypted with the new master cryptographic key provided by the client computer system. The re-encrypted envelope keys are stored 818 by the storage controller. The re-encrypted envelope keys may be stored on a flash memory on the storage controller, or on a storage device with the encrypted data associated with the envelope keys.

At block 820, the storage controller returns the status of the key rotation operation to the client computer system. The storage controller indicates to the client computer system that the key rotation operation is complete. At block 822, the client computer system receives the status from the storage controller, and the shallow key rotation operation is complete.

Figure 9:
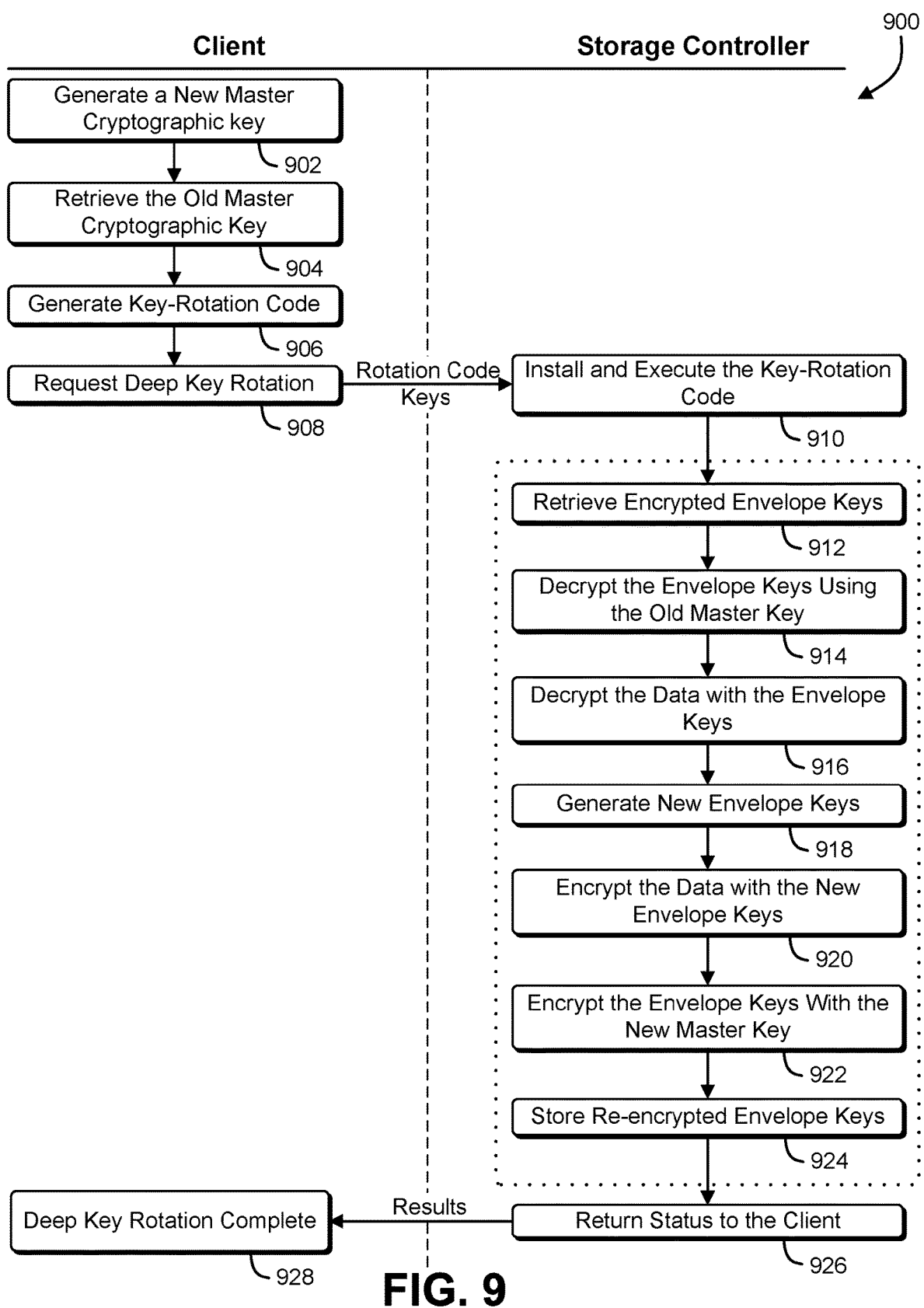
FIG. 9 shows an illustrative example of a process that, as a result of being performed by a client computer system and a storage controller, performs deep key rotation.

FIG. 9 shows an illustrative example of a process that, as a result of being performed by a client computer system and a storage controller, performs deep key rotation. A swim diagram 900 illustrates a process that begins at block 902 with the client computer system generating a new master cryptographic key. The new master cryptographic key will be used to encrypt the envelope keys which encrypt data stored on the storage controller. At block 904, the client computer system retrieves an old master cryptographic key. The old master cryptographic key is the cryptographic key that currently encrypts the envelope keys. At block 906, the client computer system generates a key rotation code to be uploaded to an execution environment on the storage controller. At block 908, the client computer system assembles a request for deep key rotation. The request includes the key rotation code, the old master key, and the new master key. If the master key is an asymmetric cryptographic key, the request includes the private key associated with the old master key and the public key associated with the new master key. The private key of the new master key is retained by the client computer system. The assembled request is submitted to the storage controller.

At block 910, the storage controller receives the deep key rotation request from the client computer system. The storage controller installs the deep key rotation code into the execution environment, and initiates execution of the deep key rotation code within the context of the execution environment. The operations shown within the dotted line on FIG. 9 are performed as a result of executing the deep key rotation code within the context of the execution environment. At block 912, the storage controller retrieves the encrypted envelope keys. The envelope keys are decrypted 914 using the old master cryptographic key provided by the client computer system.

At block 916, the storage controller accesses encrypted data retained on a data storage device associated with the storage controller. The encrypted data is decrypted using the decrypted envelope keys to produce plaintext data. At block 918, new envelope keys are generated by the storage controller. In some implementations, the new envelope keys are generated within the execution environment on the storage controller. In another implementation, the new envelope keys are generated by a key management system, and the key management system provides, to the storage controller, a reference to the new envelope keys. The reference may be used to request, from the key management system, the performance of cryptographic operations which use the corresponding new envelope keys. At block 920, the plaintext data is encrypted with the new envelope keys, and the encrypted data is stored on the data storage device.

At block 922, the envelope keys are re-encrypted with the new master cryptographic key provided by the client computer system. The re-encrypted envelope keys are stored 924 by the storage controller. The re-encrypted envelope keys may be stored on a flash memory on the storage controller, or on a storage device with the encrypted data associated with the envelope keys.

At block 926, the storage controller returns the status of the key rotation operation to the client computer system. The storage controller indicates to the client computer system that the key rotation operation is complete. At block 928, the client computer system receives the status from the storage controller, and the deep key rotation operation is complete.

Figure 10:
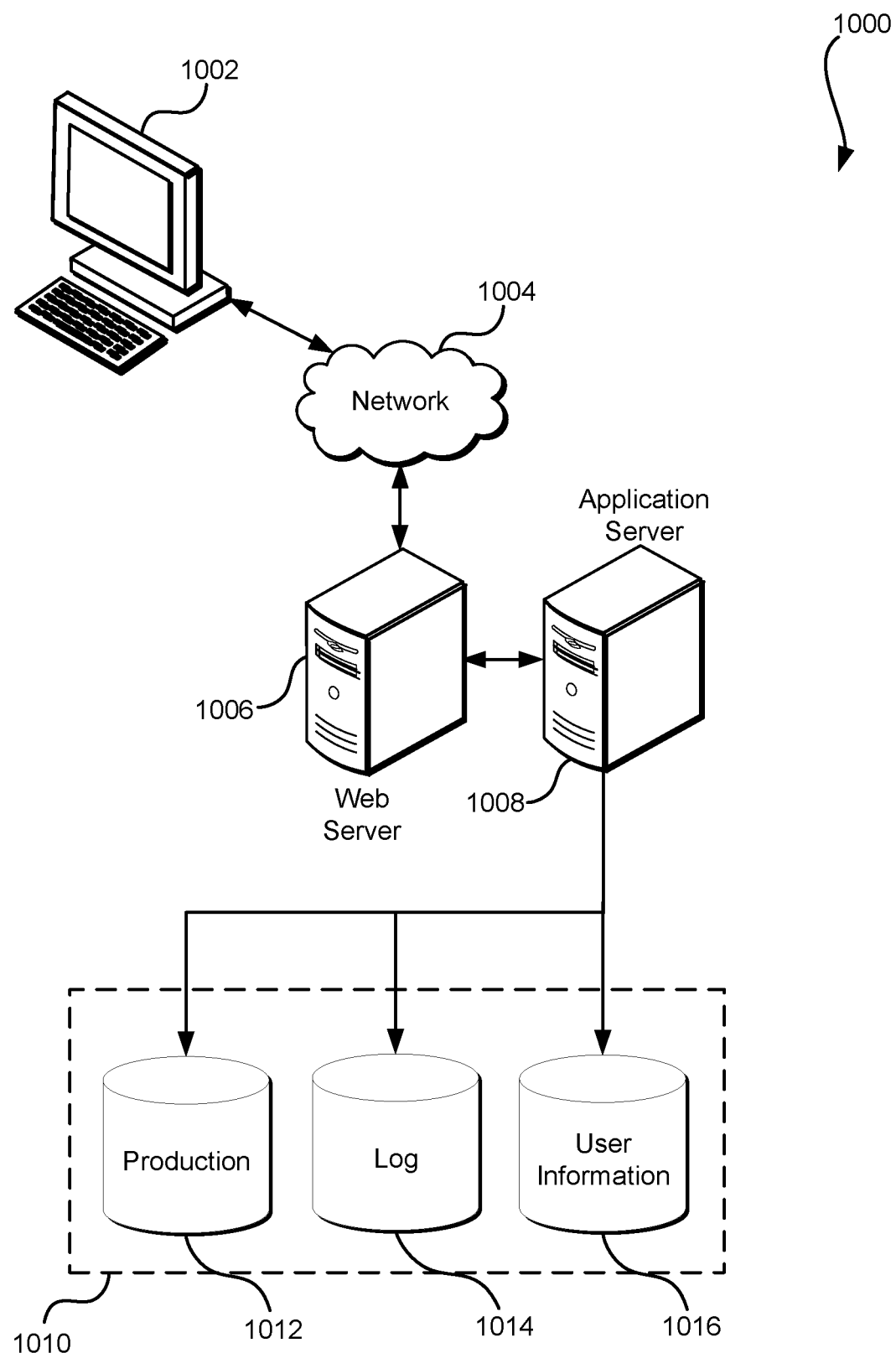
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages, or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network, and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 1002 and the application server 1008, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a webpage that the user is able to view via a browser on the client device 1002. Information for a particular item of interest can be viewed in a dedicated page or window of the browser. It should be noted, however, that embodiments of the present disclosure are not necessarily limited to the context of webpages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

Example, cryptographic algorithms include block ciphers and the various modes that utilize initialization vectors, such as the cipher-block chaining (CBC) mode, propagating cipher-block chaining (PCBC) mode, cipher feedback mode (CFB), output feedback (OFB) mode, counter (CTR) mode, and other modes, such as authenticated encryption modes such as eXtended Ciphertext Block Chaining (XCBC) mode, Integrity Aware CBC (IACBC) mode, Integrity Aware Parallelizable (IAPM) mode, Offset Codebook (OCB) mode, EAX and EAX Prime modes, Carter-Wegman+CTR (CWC) mode, Counter with CBC-MAC (CCM) mode, and Galois/Counter (GCM) mode.

As discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include the advanced encryption standard (AES), the data encryption standard (DES), triple DES (3DES), Serpent, Twofish, blowfish, CASTS, RC4, and the international data encryption algorithm (IDEA). Symmetric key algorithms may also include those used to generate output of one way functions and include algorithms that utilize hash-based message authentication codes (HMACs), message authentication codes (MACs) in general, PBKDF2, and Bcrypt. Asymmetric key algorithms may also include various schemes for performing cryptographic operations on data. Example algorithms include those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS#1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme, and the ECQV implicit certificate scheme. Other algorithms and combinations of algorithms are also considered as being within the scope of the present disclosure and the above is not intended to be an exhaustive list.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a," "an," and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   storing encrypted data on a data storage system, the data storage system accessible to a client computer system via a network, and the encrypted data encrypted with a first cryptographic key;
   generating a second cryptographic key to replace the first cryptographic key;
   providing the second cryptographic key to the data storage system;
   obtaining executable code that is compatible with an execution environment on the data storage system, wherein the execution environment is sandboxed to prevent the executable code from interfering with other components of the data storage system;
   uploading the executable code to the execution environment; and
   initiating execution of the executable code within the execution environment, the execution of the executable code causing the data storage system to:
     read the encrypted data from the data storage system into the execution environment;
     decrypt the encrypted data, according to a cryptographic algorithm determined by the client computer system, using the first cryptographic key to produce plaintext data;
     encrypt the plaintext data, according to a cryptographic algorithm determined by the client computer system, with a second cryptographic key to produce re-encrypted data; and
     store the re-encrypted data to the data storage system.

2. The computer-implemented method of claim 1, wherein:
   the execution environment includes a JavaScript interpreter;
   the executable code is JavaScript code; and
   the executable code is uploaded to the execution environment via a network connection.

3. The computer-implemented method of claim 1, further comprising:
   obtaining, from the data storage system, information that describes a characteristic of the execution environment; and
   modifying the executable code based at least in part on the characteristic of the execution environment.

4. The computer-implemented method of claim 1, further comprising:
   reading the re-encrypted data from the data storage system; and
   decrypting the re-encrypted data using the second cryptographic key.

5. A system, comprising a computing device that implements a data storage service to:
   obtain, from a client computer system, encoded data that is encoded in accordance with a first encoding;

store, on a data storage device connected to the computing device, the encoded data;

obtain, from the client computer system, a second encoding and executable instructions that are compatible with an execution environment on the computing device, wherein the execution environment is sandboxed to prevent interference with other execution environments; and decrypt the encoded data and re-encrypt the encoded data so that the encoded data is in accordance with the second encoding by at least in part executing the executable instructions, the executable instructions determining an algorithm for cryptographic operations, within the execution environment.

6. The system of claim 5, wherein:
the first encoding is a first encryption algorithm using a first cryptographic key; and
the second encoding is a second encryption algorithm using a second cryptographic key.

7. The system of claim 6, wherein:
the first cryptographic key is a public-private key pair having a first public key and a first private key;
the second cryptographic key is a public-private key pair having a second public key and a second private key; and
modifying the encoded data is accomplished in part by decrypting the encoded data with the first private key to produce decrypted data, and encrypting the decrypted data with the second public key to produce re-encrypted data.

8. The system of claim 6, wherein the first encryption algorithm is different than the second encryption algorithm.

9. The system of claim 6, wherein the data storage service:
retrieves the first cryptographic key from a key management service;
causes the second cryptographic key to be generated by the key management service; and
retrieves the second cryptographic key from the key management service.

10. The system of claim 6, wherein the data storage service further:
obtains the first cryptographic key from the client computer system;
generates the second cryptographic key; and
provides the second cryptographic key to the client computer system.

11. The system of claim 6, wherein the encoded data includes a third cryptographic key, and the data storage service further:
obtains, from a client computer system, encrypted data that is encrypted with the third cryptographic key; and
stores, on the data storage device, the encrypted data.

12. The system of claim 5, wherein:
the first encoding is an H.264 video encoding; and
the second encoding is an MPEG-4 video encoding.

13. A non-transitory computer-readable storage medium comprising executable instructions that, as a result of being executed by one or more processors of a storage controller, cause the storage controller to at least:
obtain, from a client computer system, encrypted data that is encrypted with a first cryptographic key;
store the encrypted data on a data storage device associated with the storage controller;
obtain, from a client computer system, the first cryptographic key and a second cryptographic key;
obtain, from the client computer system, information describing operations that are able to be performed within an execution environment on the storage controller, wherein the execution environment is sandboxed to prevent interference with other components of the storage controller; and perform, within the execution environment, a sequence of operations, the sequence of operations causing the storage controller to:
decrypt the encrypted data, according to a cryptographic algorithm determined by the client computer system, using the first cryptographic key to produce plaintext data; and
encrypt the plaintext data, according to a cryptographic algorithm determined by the client computer system, using the second cryptographic key.

14. The non-transitory computer-readable storage medium of claim 13, wherein:
the encrypted data includes an envelope key;
the envelope key is encrypted with the first cryptographic key; and
the non-transitory computer-readable storage medium further comprises instructions that, as a result of being executed by the one or more processors, cause the storage controller to:
obtain, from the client computer system, second encrypted data that is encrypted with the envelope key; and
store the second encrypted data on the data storage device.

15. The non-transitory computer-readable storage medium of claim 13, wherein:
the encrypted data includes a first envelope key;
the first envelope key is encrypted with the first cryptographic key;
the non-transitory computer-readable storage medium further comprises instructions that, as a result of being executed by the one or more processors, cause the storage controller to:
obtain, from the client computer system, second encrypted data that is encrypted with the first envelope key;
store the second encrypted data on the data storage device; and
obtain, from the client computer system, a second envelope key to replace the first envelope key; and
the sequence of operations further causes the storage controller to:
decrypt the second encrypted data using the first envelope key to produce second plaintext data; and
encrypt the second plaintext data using the second envelope key.

16. The non-transitory computer-readable storage medium of claim 13, wherein:
the encrypted data includes a plurality of envelope keys;
the envelope keys are encrypted with the first cryptographic key; and
the non-transitory computer-readable storage medium further comprises instructions that, as a result of being executed by the one or more processors, cause the storage controller to:
receive, from the client computer system, second encrypted data that is encrypted with a particular envelope key;
store the second encrypted data on the data storage device; and
add the particular envelope key to the plurality of envelope keys.

17. The non-transitory computer-readable storage medium of claim 16, wherein the particular envelope key is stored in association with the second encrypted data on the data storage device.

18. The non-transitory computer-readable storage medium of claim 13, further comprising instructions that, as a result of being executed by the one or more processors, cause the storage controller to:
- delete the plaintext data from the execution environment;
- delete the first cryptographic key from the execution environment; and
- delete the second cryptographic key from the execution environment.

19. The non-transitory computer-readable storage medium of claim 13, wherein:
- the second cryptographic key is a public key of a second public-private key pair; and
- a private key of the second public-private key pair is not accessible to the computer system.

20. The non-transitory computer-readable storage medium of claim 13, wherein:
- data within the execution environment is protected from being accessed from outside the execution environment; and
- the execution environment is limited to accessing data accessible to the client computer system as a result of performing, within the execution environment, the sequence of operations.

* * * * *